United States Patent [19]
Woodbridge, III

[11] 3,754,927
[45] Aug. 28, 1973

[54] THE MANUFACTURE OF EDIBLE PROTEIN FROM MARINE ANIMALS BY THE USE OF AMMONIA

[76] Inventor: Richard G. Woodbridge, III, P.O. Box 111, Princeton, N.J. 08550

[22] Filed: May 26, 1971

[21] Appl. No.: 147,160

[52] U.S. Cl............................ 99/18, 99/14, 99/111
[51] Int. Cl........................... A22c 25/00, A23j 1/04
[58] Field of Search ..................... 99/7, 14, 18, 111, 99/112, 158, 209, 208; 260/412.6

[56] References Cited
UNITED STATES PATENTS

| | | | |
|---|---|---|---|
| 2,788,275 | 4/1957 | Stobe | 99/7 |
| 2,972,542 | 2/1961 | Levin | 99/209 |
| 3,525,623 | 8/1970 | Osterman | 99/18 |

*Primary Examiner*—Hyman Lord
*Attorney*—John J. Byrne

[57] ABSTRACT

The process for making edible protein products from marine animals by removing undesirable matters through the use of solvents is greatly improved by carrying out the extraction in the presence of ammonia or ammonium ion. The inclusion of ammonia or ammonium ions facilitates the removal of undesirable odor and color materials and so makes possible the practical production of products with reduced undesirable odor and greater whiteness or may be so utilized as to produce products of levels of odor and color acceptable in the trade but with improved economies of manufacture.

8 Claims, No Drawings

THE MANUFACTURE OF EDIBLE PROTEIN FROM MARINE ANIMALS BY THE USE OF AMMONIA

This invention pertains to the production of edible protein products from a variety of marine animals by the use of suitable solvents or mixtures of solvents which extract and remove undesirable matters from the marine animals to produce a residual material, mainly protein, which protein material is suitable for consumption by animals and humans.

The object of my invention is to produce protein products from a variety of marine animals by solvent extraction, which products are superior to products hither-to-made or impossible or difficult to make by existing solvent extraction process; or to produce protein products with properties acceptable in the trade but with improved economies of manufacture, such as fewer extraction steps and greater efficiency.

An additional object of my invention is to produce edible protein products from a variety of marine animals by subjecting such animals, after being divided into appropriately small pieces, e.g. comminution, to one or more extractions using one or more solvents, separately or mixed, selected from the chemical families of alcohols, ethers, glycols, ether-alcohols, chlorhydrins, chlorchydrocarbons, sulfoxides, hydrocarbons and also water, and to which solvents or solvent-systems is added gaseous ammonia.

An additional object of my invention is to produce edible protein products from a variety of marine animals by subjecting such animals, after being divided into appropriately small pieces, e.g. comminution, to one or more extractions using one or more solvents, separately or mixed, selected from the chemical families of alcohols, ethers, glycols, ether-alcohols, chlorhydrins, chlorohydrocarbons, sulfoxides, hydrocarbons and also water, and to which solvents or solvent systems is added ammonia previously dissolved in one or more of the above solvents.

An additional object of my invention is to produce edible protein products from a variety of marine animals by subjecting such animals, after being divided into appropriately small pieces, e.g. comminution, to one or more extractions using one or more solvents, separately or mixed, selected from the chemical families of alcohols, ethers, glycols, ether-alcohols, chlorhydrins, chlorohydrocarbons, sulfoxides, hydrocarbons and also water, and to which solvents or solvent-systems is added a source of ammonium ions, such as one or more of the ammonium salts of phosphoric acid or of carbonic acid. The ammonium salts used may be introduced as solids or in solution or generated by the action of ammonia on carbonic or phosphoric acid in one or more of the above solvents.

An additional object of my invention is to produce edible protein products from a variety of marine animals by subjecting such animals, after being rendered or partially rendered by hot water or steam (such as the material known as "Press Cake" in the manufacturing of fish meal) and after being divided into appropriately small pieces, e.g. comminution, if necessary, to one or more extractions using one or more solvents, separately or mixed, selected from the chemical families of alcohols, ethers, glycols, ether-alcohols, chlorhydrins, chlorohydrocarbons, sulfoxides, hydrocarbons and also water, and to which solvents or solvent systems is added ammonia as a gas or solution or in ionic form, so as to effect the extraction in the presence of ammonia or ammonium ion.

The preparation of edible protein from a wide variety of marine animals is old in the art. In general all methods embody the separation of the desirable protein from the undesirable matters of the animal. An example of a simple mechanical method is the filleting of fish. An example of a mechanical-chemical method is the preparation of "fish meal," in which a certain portion of the oils and other matters in fish are rendered from the fish meat and bones by the use of heat and hot water-steam combination.

In recent years considerable attention has been given to the preparation of protein suitable for human and animal consumption from fish by solvent extraction methods, using as solvents such materials as alcohols (particularly isopropyl alcohol), alcohol-water mixtures, ethylene dichloride and hydrocarbons such as hexane.

A brief description of three of such solvent extraction methods follows:

First Method: — This method, commonly known as the Halifax Process, may be found described in considerable detail in "Marine Protein Concentrate" a publication of the United States Department of the Interior, Fish and Wildlife Service, Bureau of Commercial Fisheries, Fishery Leaflet 584. In summary: ground-up, whole fish are subjected in a counter-current manner to a sequence of extractions using isopropyl alcohol and isopropyl alcohol-water mixtures. The isopropyl alcohol is subsequently recovered by distillation. The final recovered protein product, after drying and milling is a fine powder, varying in color from a gray to light tan to off-white color with only slight odor. It is considered to be suitable for human consumption.

References to processes in some ways similar to the so-called Halifax Process may be found in the following patents: — U.S. Pat. No. 2,813,027, Nov. 12, 1957; Dutch 92,828, Dec. 15, 1959; Fr. 1,492,228 (Cl.A 23j), Aug. 18, 1967; Brit. 1,106,676 (Cl.A 23Kl), Mar. 20, 1968; U.S. Pat. No. 2,875,061, Feb. 24, 1959; U.S. Pat. No. 3,164,471 (Cl 99–18) Jan. 5, 1965; U.S. Pat. No. 3,252,962 (Cl. 260–112), May 24, 1966, U.S. Pat. No. 1,934,677, Nov. 14, 1933; U.S. Pat. No. 547,548, Oct. 8, 1895.

Second Method: — This method, commonly known as the VioBin or Levin Process, a reference to which may be found in Chemical Engineering, Apr. 10, 1967, pages 176–178, consists essentially in subjecting pieces of fish to extraction using ethylene dichloride with a final extraction using isopropyl alcohol. Both solvents are later recovered by distallation. The protein product, after drying and milling is a fine powder, and varies in color from a gray to a light tan to off-white, with slight odor. The product is considered to be suitable for human consumption.

References to the so-called Levin process and processes in some way similar may be found in the following patents: — U.S. Pat. No. 2,503,313, Apr. 11, 1950; U.S. Pat. No. 2,539,544, Jan. 3, 1951; U.S. Pat. No. 2,972,542, Feb. 21, 1961; Brit. 1,127,329; U.S. Pat. No. 2,503,312, Apr. 11, 1950; U.S. Pat. No. 2,788,275, Apr. 9, 1957; U.S. Pat. No. 294,940, Mar. 11, 1884; U.S. Pat. No. 2,536,345, Jan. 2, 1951; U.S. Pat. No. 2,345,099, Mar. 28, 1944.

Third Method: — This is to embody processes commonly thought of as "up-grading" "fish meal." Such processes involve solvent extraction of "fish meal" using solvents such as alcohols (particularly isopropyl alcohol) and hydrocarbons such as hexane. The solvents are subsequently recovered by distillation. The protein products so obtained are generally considered to be inferior to the products produced by the First Method and Second Method (above) being often dark in color and unpleasantly odorous. For a reference to such a process (using hexane and subsequently isopropyl alcohol) see National Fisherman, Nov. 1969, page 7–C.

Reference to the use of hydrocarbons for the preparation of protein products from marine animals may be found in the following patents: — Brit. 1,167,673. (Cl.C 11b), Oct. 22, 1969; U.S. Pat. No. 3,064,018 (Cl.260–412.4), Nov. 13, 1962; S. Afr. 6,705,900, Feb. 12, 1968; U.S. Pat. No. 1,934,677, Nov. 14, 1933; U.S. Pat. No. 119,000, Sept. 19, 1871; U.S. Pat. No. 432,808, July 22, 1890; U.S. Pat. No. 294,940, Mar. 11, 1884.

It is considered that the function of the solvents in such extraction processes is 1.) to extract the oils, fats and greases; 2.) to extract water; 3.) to extract colors, pigments and color forming matters; 4.) to extract those materials (referred to as "odor bodies") which would impart to the finished product unpleasant odors; 5.) to extract materials which possibly could be toxic or harmful; and, in addition 6.) to sterilize the product by rendering harmless or killing viruses, bacteria, fungi, and other organisms. Depending upon the solvent or mixtures of solvents employed, the sequence of processing and the many process variables involved (such as temperature, concentration, etc.) the suitability of the final protein product for human consumption can vary widely — particularly as to color and odor.

By solvent I means a liquid phase material which will by dissolving, dispersing, emulsifying, forming a colloidal suspension or in some other physical or chemical process or combination of such actions remove or aid in the removal from the solid phase those materials which are in such a manner removable. I include in such term, "solvent," a liquid phase to which has been added materials such as surface-active agents, dispersants, emulsifiers, cell-breakers and rupturers, chelating agents, antibacteria agents, antivirus agents, antifungus agents, bleaching agents, brighteners, salts and other such additive materials. I include in the term solvent the pure as well as commercially available alcohols (including ethyl, normal propyl, isopropyl, normal butyl, secondary butyl, isobutyl, tertiary butyl), ethers (including dimethyl, diethyl, methylethyl, furan, tetrahydrofuran and their methyl derivatives), glycols (including ethylene, propylene), tri-ols (including glycerine), chlorhydrins (including ethylene chlorhydrin), chlorohydrocarbons (including carbon tetrachloride, chloroform, methylene chloride, dichloromethane, ethylene dichloride, trichlorethane, trichlorethylene, perchlorethylene), fluorine and chlorine derivatives of methane, ethane and propane, hydrocarbons and their isomers (including ethane, propane, butane, pentane, hexane, gasoline, kerosene, petroleum ether, benzine and similar petroleum fractions, benzene, cyclohexane, decalin, tetralin dimethyl sulfoxide), water and any other compound known to extract undersirable matters from marine animal material, whether as single compounds, mixtures, combinations or constituted as azeotropes. By the term solvent extraction I means the use of a solvent to extract those matters from a solid material which may be extracted by the appropriate use of a solvent. By the term solvent system, I mean that solvent or mixture of solvents used to effect an extraction. By terms such as "edible," suitable for human or animal consumption" "suitable for consumption" I mean a material or materials which may be eaten by humans or animals, irrespective of nutritional value. By "protein products" "protein" and similar terms where appropriately used, I means a material or materials consisting for the most part of those polymerized amino-acids originally constituting the animal, and also its contents if any, irrespective of the degree of naturation or denaturation or other change from its original state. By the term "odor" I mean the smell as sensed and appreciated by the human nose. By the term "odor-bodies" I means those substances which have an "odor" or will through some chemical or physical reaction cause an "odor." By the term "color" "Whiteness" and similar terms I mean those properties perceived and judged as such by the human eyes under normal illumination. By the term "color-bodies" I mean those substances which have "color" or will through some chemical or physical change produce a "color."

I have discovered that by suitably incorporating ammonia in the solvent or mixture of solvents used, correctly sequenced and under appropriate conditions, the extraction and removal of oils, fats and greases, water, colors, pigments, color-forming materials and of "odor bodies" is greatly facilitated resulting in products of improved whiteness and reduced odor.

Or conversely, my discovery permits the production of products with the color and odor, etc. of products produced without the use of ammonia — but my process, with the use of ammonia, requires fewer processing steps, and results in increased efficiency.

Also the separation of the liquid solvent phase from the solid protein phase is greatly facilitated, whether this is carried out by filtration or by some other means, with the attendant economics.

Also by the inclusion of ammonia in the solvent or mixture of solvents used, additional benefits are derived. The removal of materials which are or might be considered as being toxic (e.g. copper, guanine, etc.) is facilitated.

Also, I have found that the product produced by the inclusion of ammonia evolves on storage less objectionable odor than when ammonia is not used.

My discovery was unexpected and surprising. I was searching for a method which would inhibit the hydrolysis of the amide linkage of proteins which I suspected was occurring in part when edible protein was made from fish by extracting fish with a solvent and which hydrolysis might also be a factor in storage stability. By adding ammonia I sought to throw the equilibrium of the amide plus water going to acid plus amine reaction (which conceivably might be reversable) back toward the amide side and was startled and surprised at the ease and facility of the entire extraction process which resulted. The removal of color, odor and other matters was greatly improved and in addition mechanical properties of slurrys, etc. were greatly improved leading to much easier handling and greatly expediting steps embodying the separation of liquid and solid phases such as in filtration.

My invention may be applied to the production of edible protein from marine animals such as the following:

Of the phylum mollusca, the class pelecypoda (i.e. the mussels, clams, oysters and other bivalves) and the class cephalopoda (i.e. the squids):

Of the phylum arthropoda, the class crustacea (i.e. the copepoda, krill, lobsters crayfishes, crabs and shrimp);

Of the phylum chordata, the class elasmobranchii (skates, rays, sharks and dogfish) and the class pisces (the fish);

And to mixtures and combinations of marine animals (both adult and/or larval forms) co-mixed or such as are found in nature in the zooplankton of the seas and fresh waters, including that zooplankton commonly referred to as krill (e.g. Euphausia superba).

Specifically my invention consists of adding ammonia (either as a gas or as a solution in water or some other suitable solvent or utilizing a salt of ammonia as a source of ammonium ions) to the solvent or mixture of solvents at one or more points in the extraction sequence which includes the addition of ammonia either as a gas or in solution (or a source of ammonium ion may be so utilized) to the solid phase, which subsequently is subjected to solvent extraction, or to the slurry of the solvent and the animal matter being extracted. Following the extraction sequence, a separation of the solid phase containing the desired protein from the liquid phase may be effected, with subsequent subjection of the solid phase to suitable conditions of temperature and pressure as to effectively remove solvent, water and ammonia (in whole or in part) to produce a product which may be further milled to a fine powder. A certain portion of the ammonia used in the extraction process may be permitted to remain in the product or may be added to the product as storage stability under certain conditions is then enhanced. The solvent-water-ammonia-impurities (including any dissolved protein) phase system may then be subjected to distillation, solvent extraction, flotation or some other method of separation to recover the solvent in a re-usable form and to recover ammonia and dissolved protein if such is desirable.

The following examples of preferred practice illustrate but are not intended to show the limits of my invention.

EXAMPLE NO. 1

Edible Protein from Squid, Ommasthrephes sagittus.

WASHING

Raw squids are cut into small pieces approximating one-fourth inch three-fourth inch. These pieces are placed in a suitable container with 0.5 gallons (U.S.) of water per pound of squids, stirred, removed by a sieve device and drained. The pieces of squid are then washed a second time with the same amount of water, removed with a sieve device and allowed to drain.

This washing procedure is usually necessary in the case of commercially netted squids as there usually are sufficient squids which have not emptied their ink sacks, to cause the sepia (if not removed by washing) to color the finished product a gray to nearly black color.

EXTRACTION

First Extraction: The washed, raw squid pieces are then introduced into a suitable contained fitted with a high speed, blender, recirculating type, impeller and 0.228 gallons (U.S.) of 99 percent isopropyl alcohol per pound of raw squids are added. The pieces of raw squid are then comminuted in the alcohol until a slurry is obtained. At this time 0.0012 gallons (U.S.) of concentrated aqueous ammonia (28.9% as $NH_3$) per pound of raw squids are introduced and the impeller operated until the ammonia is dispersed throughout the slurry.

The solid portion of the slurry is then separated from the liquid portion by filtration in a nutsch type filter with stirring to expedite the removal of the liquid.

The rather grainy, fibrous cake is then pressed at high pressure between platens to remove as much of the liquid as possible. A small sample of this cake dries a dark, brown-purple color.

Second Extraction: The pressed cake from the First Extraction is then introduced into a suitable container and 0.228 gallons (U.S.) per pound of raw squids of 99 percent isopropyl alcohol are added. The material is reslurried and stirred for 10 minutes. After filtration and pressing the cake from this second extraction is allowed to dry. The product so obtained is nearly snow white, tasteless and has little or no odor. A portion of the product was eaten.

Product yield approximates 0.11 lbs. per pound of raw squids started with.

By milling the above product a fine, white powder is obtained.

All steps are conducted at ambient temperature.

The improvement achieved by the use of ammonia in this example over extraction without using ammonia with the same number of extraction steps is in the production of a product of superior properties, such as superior whiteness and less odor, with much greater ease and facility. EXAMPLE NO. 2 — Edible Protein from Fish (Haddocks, Melanogrammus aeglefinus).

First Extraction: Raw haddocks are passed through a meat grinder. The ground material is placed in a suitable container fitted with a high-speed propeller type agitator and 0.228 gallons (U.S.) per pound of raw haddocks of 99 percent isopropyl alcohol are added. The agitator is operated for 5 minuted.

To the slurry is then added 0.0012 gallons (U.S.) per pounds of raw haddocks of concentrated aqueous ammonia (28.9% as $NH_3$) and the agitator is operated 5 more minutes.

The slurry is then filtered on a nutsch type filter with stirring. The cake is then pressed at high pressure between squeeze rolls. A small sample of this cake dries a yellow color.

Second Extraction: The cake from the first extraction is introduced into a suitable container fitted with a high-speed, propeller type agitator and 0.228 gallons (U.S.) per pound of raw haddocks of 99 percent isopropyl alcohol are added. The agitator is operated 10 minutes.

The slurry so obtained is filtered on a nutsch type filter with stirring. The cake is pressed at high pressure between squeeze rolls.

The pressed cake is then allowed to dry.

The product so obtained is snow white in color, has no taste and is odorless. A portion of the product was eaten.

Product yield is 0.172 lbs. per pound of raw haddocks started with.

Milling converts the product into a fine, white powder.

All steps are conducted at ambient temperature.

The improvement attained by the use of ammonia in this example over extraction without the use of ammonia using the same number of extraction steps is in the production of a product of superior properties, such as superior whiteness, less odor, greater stability and in greater yield and with greater ease and facility.

While Example No. 1 and Example No. 2 illustrate the production of edible protein products from squid and from fish by my process in which ammonia is added to be a component of the solvent or mixture of solvents the following examples illustrate the making of edible protein products from other animals and also illustrate, but do not delimit, modifications of my process. EXAMPLE No. 3 — Edible Protein from Shrimp, Penaeus setiferus (in which my process is modified by a concluding acid wash).

First Extraction: Shrimp bodies are thoroughly triturated by pressing under an iron roller and then placed in a suitable container. Isopropyl alcohol is then added in amount equal to 0.18 gallons (U.S.) of 99 percent isopropyl alcohol per pound of shrimp, and 0.0024 gallons (U.S.) of concentrated aqueous ammonia (28.9% as $NH_3$) per pound of shrimp is added. The mixture is then stirred for 10 minutes. The mixture is then subjected to the action of a high-speed propeller type agitator and comminuted for 30 seconds.

The slurry is then filtered on a nutsch type filter with stirring. The cake is then pressed between platens to remove as much liquid as possible. A small sample of this cake dries to a dirty-grey color.

Second Extraction: The cake from the first extraction is introduced into a suitable container. To this is added 0.18 gallons (U.S.) of 99 percent isopropyl alcohol per pound of raw shrimp and the mixture stirred for 10 minutes.

The slurry so obtained is filtered on a nutsch type filter with stirring. The cake is then pressed as dry as possible between platens. A small sample of this filter cake dries white.

Third Extraction: The cake from the second extraction is introduced into a suitable container. To this is added 0.18 gallons (U.S.) of 99 percent isopropyl alcohol per pound of shrimp. The slurry is stirred for 10 minutes. To this is added 0.0016 gallons (U.S.) of 85 percent phosphoric acid per pound of shrimp. The mixture is stirred for an additional ten minutes and then is filtered on a nutsch type filter with stirring. The cake is pressed as dry as possible between platens and is then permitted to dry.

The product so obtained is snow-white and odorless. A portion of the product was eaten.

Product yield is 0.144 lbs. of product per pound of starting material.

Milling converts the product into a fine, white powder.

All steps are conducted at ambient temperature.

The improvement attained by the use of ammonia in this example over extraction without the use of ammonia lies in making a product superior in whiteness and odor with only three extraction steps and with much greater ease. Without using ammonia, I found it necessary to extract as many as eight times to produce a comparable product.

The use of phosphoric acid in the last extraction step produces a product which is odorless when first made. The product when made without using phosphoric acid has a barely detectable odor when first made; however, samples of the product made using phosphoric acid in the last extraction step developed a very strong, unpleasant odor on six months storage, while samples of product made without adding phosphoric acid had only a very faint odor. So, to produce a product with superior storage property, as far as odor is concerned, the above process should be used but without the addition of phosphoric acid.

EXAMPLE NO. 4

— Edible Protein from Clams, Mya arenaria (in which my process is illustrated by introducing ammonia as a gas and also in which an intermediate drying step is introduced).

First Extraction: Clam bodies (i.e. shucked clams) are introduced into a suitable container which is fitted with a higher-speed propeller type agitator and 0.16 gallons (U.S.) of 99 percent isopropyl alcohol per pound of clam bodies are introduced. The propeller is turned on and the mixture agitated 45 seconds.

Into the dirty, yellow-colored slurry is bubbled ammonia gas. It is found that on bubbling in the ammonia gas, the temperature of the mixture rises and then begins to fall. The ammonia is bubbled in for 5 minutes after the temperature begins to fall.

The slurry is then filtered through paper and the cake pressed as dry as possible. The filtrate is dark yellow in color. A small sample of this filter cake dries to a yellowish-green color.

Second EXtraction: The cake from the first extraction is placed in a suitable container and 0.16 gallons (U.S.) per pound of clam bodies of 99 percent isopropyl alcohol are added. The mixture is stirred for 10 minutes and then filtered as in the First Extraction. The filter cake is pressed as dry as possible.

This is followed by a Third, Fourth and Fifth extraction each conducted as in the Second Extraction. The cake is allowed to dry 24 hours.

Sixth Extraction: The dry, dark yellow, odorless cake is introduced into a suitable container fitted with a high-speed propeller type agitator and 0.16 gallons (U.S.) of 99 percent isopropyl alcohol per pound of clam bodies are introduced. To this is added 0.002 gallons (U.S.) per pound of clam bodies of concentrated aqueous ammonia (28.9% $NH_3$) and the propeller turned on for one minute.

The slurry is then filtered as in the First Extraction. The cake is pressed as dry as possible and then permitted to dry.

The product so obtained is odorless and is a pale yellow in color. On six months storage, no odor is detected. A portion of this product was eaten.

Product yield is 0.095 pounds per pound of starting material.

Milling converts the product into a fine powder, very faintly yellow in color.

All steps are conducted at ambient temperature.

The improvement attained by the use of ammonia in this example makes the extraction process possible. In attempts to make an edible protein from clams without the use of ammonia intractable slurrys occurred, gelatinous and colloidal, which I found impossible to filter.

In-other-words, without the use of ammonia the extraction process would not work.

EXAMPLE NO. 5

Edible Protein from Skate, Raja laevis (in which my process is illustrated by using the isopropyl alcohol-water azeotrope as solvent and introducing the ammonia into a portion of the solvent before beginning the extraction).

First Extraction: Chopped-up, raw skate is placed into a suitable container fitted with a high-speed propeller type agitator and 0.18 gallons (U.S.) per pound of raw skate of the isopropyl alcohol-water azeotrope are added. The mixture is agitated for 1 minute. To this is added additional solvent previously saturated with ammonia. This ammoniated solvent consists of 0.06 gallons (U.S.) per pound of raw skate of isopropyl alcohol-water azeotrope which volume is then saturated with ammonia gas.

The slurry is agitated for 15 seconds.

The stringy, fibrous solid material is separated from the liquid by filtering. The cake is squeezed as dry as possible between platens.

Second Extraction: The cake from the first extraction is placed in a suitable container. To this is added 0.18 gallons (U.S.) per pound of raw skate of the azeotrope of isopropyl alcohol and water. The mixture is stirred for 20 minutes. It is then filtered and the cake squeezed as dry as possible, as before.

Third Extraction: The cake from the second extraction is placed in a suitable container. To it is added 0.18 gallons (U.S.) per pound of raw skate of the isopropyl alcohol-water azeotrope. 85 percent phosphoric acid is then added with slow stirring until the slurry is acid to litmus paper. The mixture is stirred for 20 minutes and then filtered. The cake is squeezed as dry as possible.

Fourth Extraction: The cake from the Third Extraction is placed into a suitable container. To this is added 0.18 gallons (U.S.) per pound of raw skate of the isopropyl alcohol-water azeotrope and the mixture is stirred for 30 minutes. It is then filtered. The stringy, fibrous cake is squeezed as dry as possible, as before, and then permitted to dry.

The product so obtained is odorless and is a slight grey-yellow in color.

Product yield is 0.21 lbs. per pound of starting material.

It is difficult to mill; however, milling converts it to a light, grey powder. A portion of the product was eaten.

All steps are conducted at ambient temperature.

The use of ammonia makes possible the production of a product of lighter color and without odor in a fewer number of extractions than if ammonia had not been used.

In all examples a multitude of variations have been found to be practicable. For example, ammonia gas dissolved in isopropyl alcohol may be used instead of using the concentrated aqueous ammonia. Also, the ammonia (as gas or solution) may be introduced at the start or end of en extraction step rather than at some intermediate time. Also, the ammonia (as gas or solution) may be omitted in the first extraction but introduced in the second extraction, or in a subsequent extraction. Also, instead of using 99 percent isopropyl alcohol, isopropyl alcohol-water mixtures (e.g. the isopropyl alcohol-water azeotrope) may be utilized in one or more of the extraction steps which isopropyl alcohol-water mixture is made suitable ammoniacal, or the solvent system used in a previous or subsequent extraction step is rendered ammoniacal.

Also, in the above examples ambient temperature is indicated. Higher temperatures may be used in one or more of the extraction steps.

Also, the proportions used may be varied widely. Edible protein products have been made using amounts of ammonia ranging on the low end to only sufficient ammonia to render the mixture of starting material and solvent system just alkaline to litmus paper to amounts of ammonia constituting a saturatred solution of ammonia in 99 percent isopropyl alcohol.

While the examples given refer only to a non-counter-current operation. This improved process has been operated in a counter-current mode in which the filtrate from the last extraction is used as the solvent for the preceding stage, etc.

While the examples given refer only to a batch method of operation, the use of ammonia may also be used in conjunction with a continuous mode of operation. For example, I have found that coarse pieces of raw squid may be purified to an edible product by counter-current passage through a liquid phase which liquid phase enters as an isopropyl alcohol-water mixture, if at a suitable point of the system ammonia (as a gas or solution) is at that point introduced with a mechanism being provided to ensure adequate mixing.

Also, while in general, ammonia (as a gas or solution) has been referred to in this disclosure, various ammonium salts have also been found useful, particularly ammonium carbonate and the ammonium phosphates. Such salts may be introduced either as solids or in appropriate solution or generated in situ.

Also, my process may be modified by a variety of processing steps. For example, washing (as in Example 1), boiling, blanching, freeing from water, drying (as in Example 4), steam rendering, etc.

The foregoing processes are only meant as illustrative examples of my invention and are not intended to limit the scope of my claims.

I claim:

1. In a process for the manufacture of edible protein products from marine animals including a step of treating the marine animals with one or more solvents which will extract and remove undesirable matters from the marine animals to produce a residual material, mainly protein, which protein material is suitable for consumption by animals and humans, the improvement comprising introducing into at least one of the solvents at least enough ammonia to render the solvent alkaline to litmus paper.

2. The process of claim 1 above wherein the ammonia is added in gaseous form.

3. The process of claim 1 above wherein the ammonia is added as a solution of ammonia dissolved in a solvent, such solvent to be taken from any one or combination of the following: ethyl alcohol, isopropyl alcohol, water or any other solvent, or mixtures of solvents which will be a solvent to extract from marine animals the oils, fats, color-bodies, odor-bodies and other undesirable matters.

4. The process of claim 1 above wherein the ammonium ion is introduced or generated in situ through the addition of an ammonium salt of phosphoric acid or carbonic acid.

5. The process of claim 1 above wherein the ammonia or ammonium ion is introduced by adding ammonia or ammonium ion to the material to be extracted prior to its contact with the solvent or solvent mixtures.

6. The process of claim 1 above wherein the ammonia or ammonium ion is introduced by adding ammonia or ammonium ion to the mixture of material being extracted and the solvent or solvents used.

7. The process of claim 1 above wherein the ammonia is introduced as gaseous ammonia or as ammonia dissolved in a solvent, said solvent to be ethyl alcohol, isopropyl alcohol, water or any other solvent or mixture of solvents which will be a solvent to extract from marine animals the oils, fats, color-bodies, odor-bodies, and other undesirable matter, or as ammonium ion through the addition of an ammonium salt of phosphoric acid or carbonic acid and the solvent used for the extraction is one or more, in combination or singly, of the following: ethyl alcohol, normal propyl alcohol, isopropyl alcohol, dimethyl ether, methylethyl ether, diethyl ether, furan, tetrahydrofuran, glycerine, ethylene chlorhydrin, ethylene dichloride, dimethylsulfoxide, ethane, the isomers of ethane, propane, the isomers of propane, butane, the isomers of butane, pentane, the isomers of pentane, hexane, the isomers of hexane, gasoline, kerosene, petroleum ether, benzene and similar petroleum fractions, water and any other compound or substance, alone or in mixtures or combinations or constituted as azeotropes which will be a solvent to extract from marine animals the oils, fats, color-bodies, odor-bodies and other undesirable matters.

8. The process of claim 1 above wherein the ammonia is introduced as gaseous ammonia or as ammonia dissolved in a solvent, such solvent to be ethyl alcohol, isopropyl alcohol, water or any other solvent or mixture of solvents which will be a solvent to extract from marine animals the oils, fats, color-bodies, odor-bodies and other undesirable matters, or as ammonium ion through the addition of an ammonium salt of phosphoric acid or carbonic acid and the solvent used for the extraction is one or more, in combination or singly, of the following: ethyl alcohol, normal propyl alcohol, isopropyl alcohol, dimethyl ether, methylethyl ether, diethyl ether, furan, tetrahydrofuran, glycerine, ethylene chlordydrin, ethylene dichloride, dimethylsulfoxide, ethane, the isomers of ethane, propane, the isomers of propane, butane, the isomers of butane, pentane, the isomers of pentane, hexane, the isomers of hexane, gasoline, kerosene, petroleum ether, benzene and similar petroleum fractions, water and any other compound, alone or in mixtures or combinations or constituted as azeotropes which will be a solvent to extract from marine animals the oils, fats, color-bodies, odor-bodies and other undesirable matters; and, the marine animals are taken from the following classes of animals: pelecypoda, cephalopoda, crustacea, elasmobranchii and pisces and to mixtures and combinations of animals from these classes.

* * * * *